Sept. 19, 1950  N. RANSOHOFF  2,523,058
WASHING MACHINE HAVING A ROTARY CONVEYER
AND AUTOMATIC FEED AND DISCHARGE MEANS
Filed Nov. 11, 1944  6 Sheets-Sheet 1

INVENTOR.
Nathan Ransohoff
BY
Wood, Arey, Herron & Evans
Attorneys.

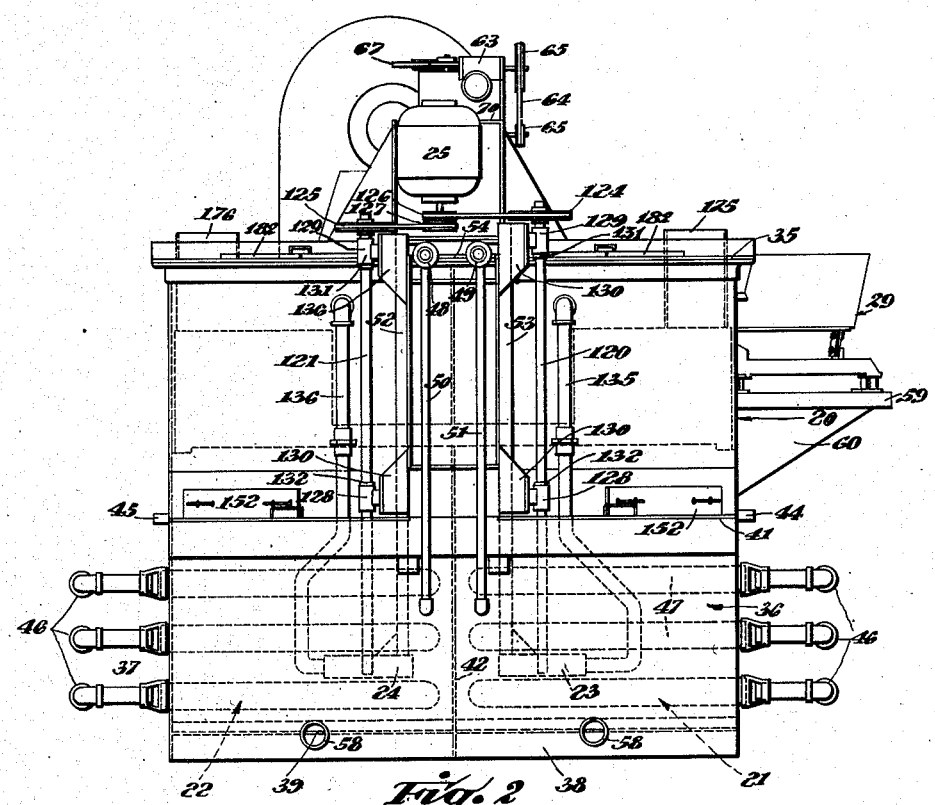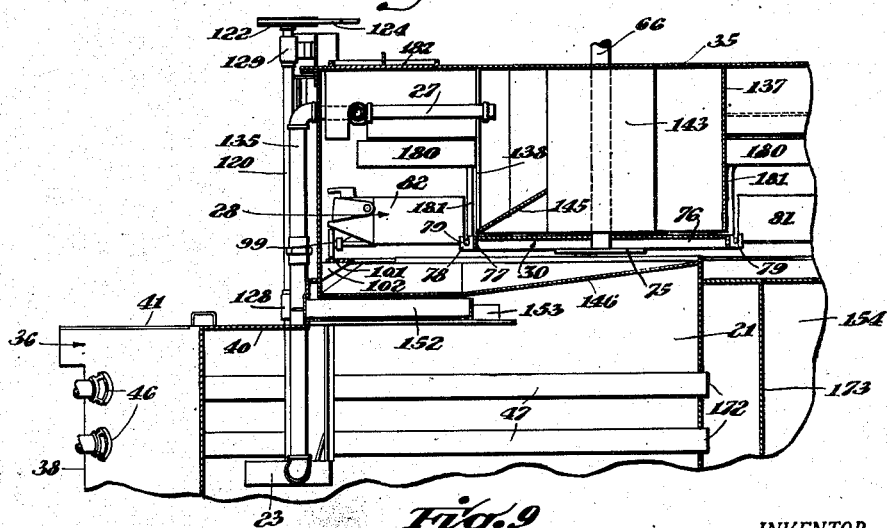

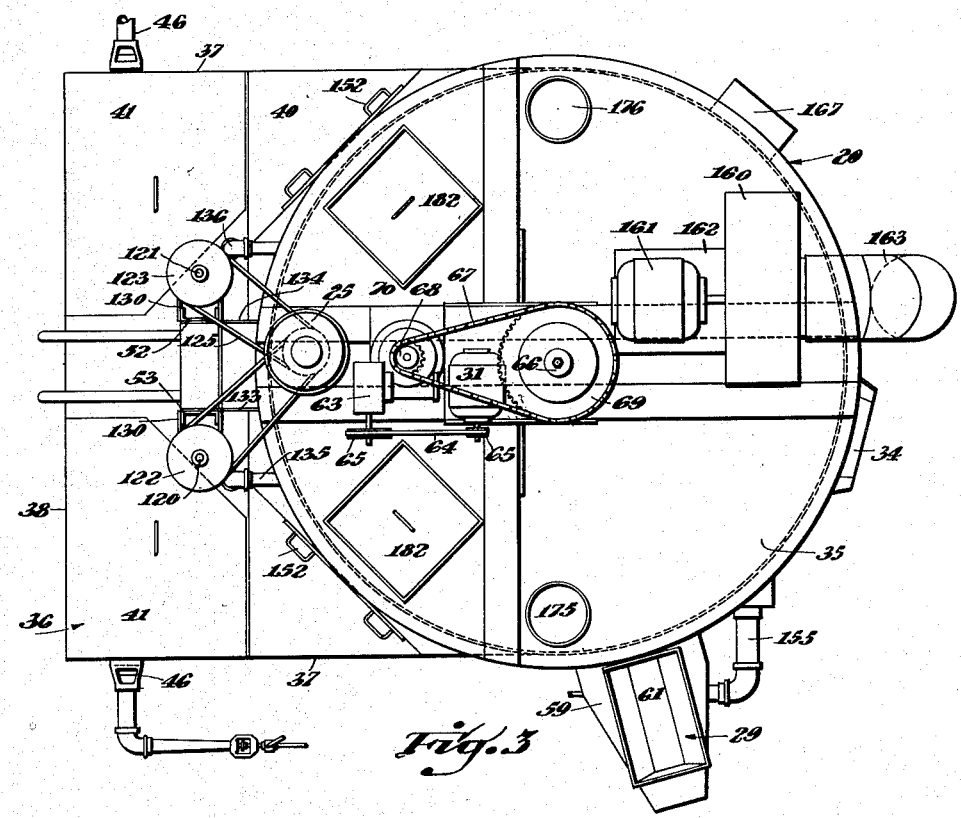
Fig. 3
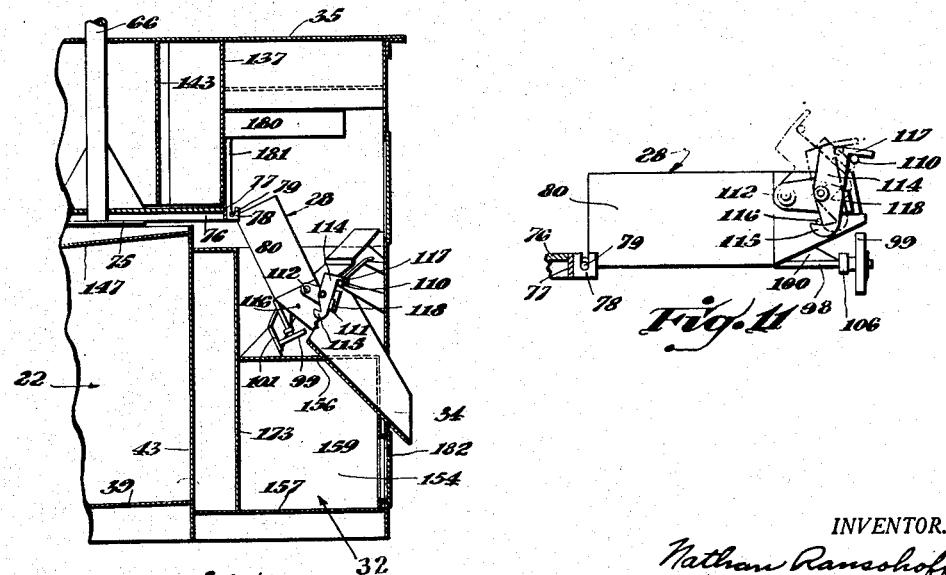
Fig. 10
Fig. 11

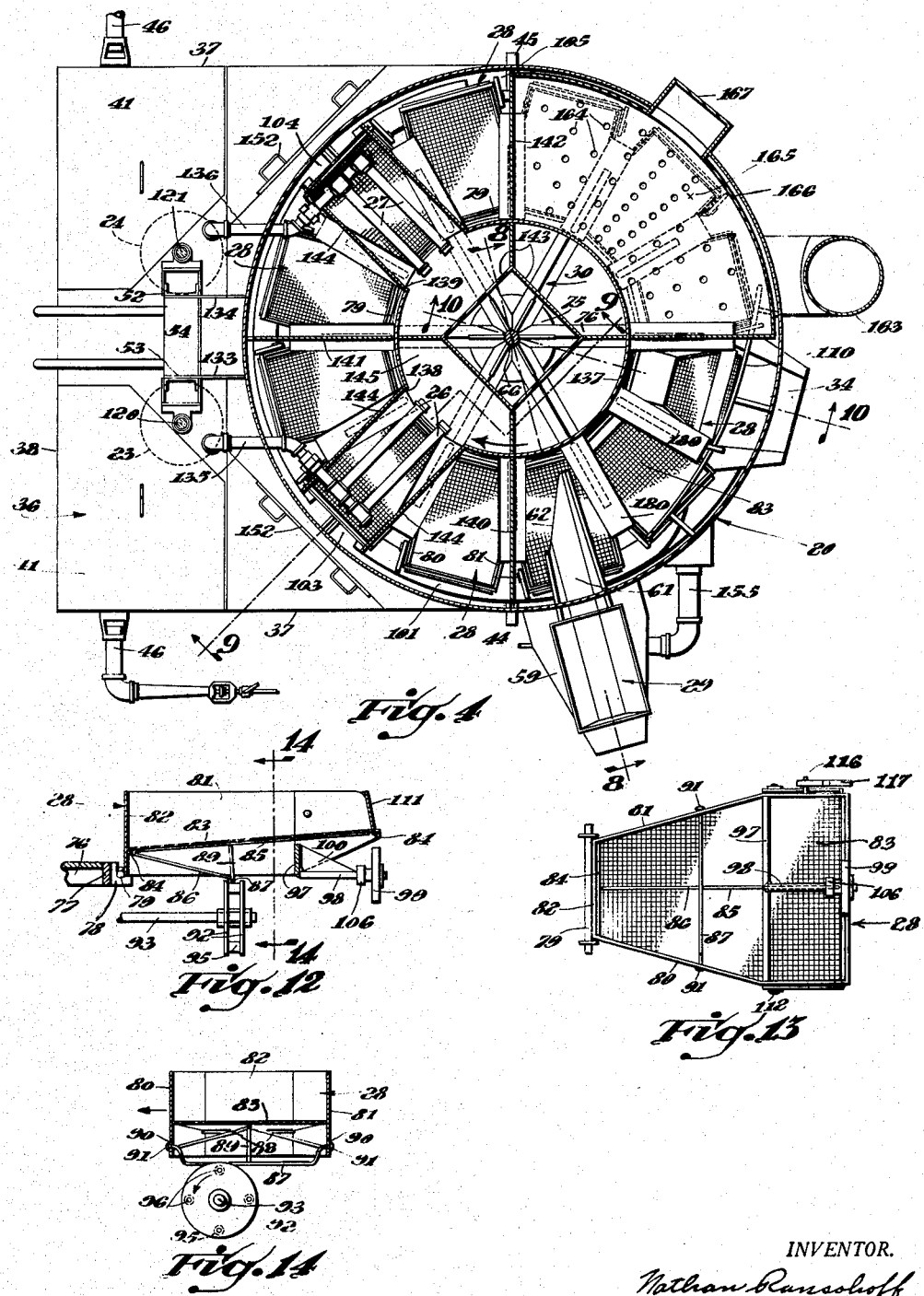

Sept. 19, 1950            N. RANSOHOFF           2,523,058
WASHING MACHINE HAVING A ROTARY CONVEYER
AND AUTOMATIC FEED AND DISCHARGE MEANS
Filed Nov. 11, 1944

INVENTOR.
Nathan Ransohoff
BY
Wood, Arey, Herron & Evans
Attorneys.

Sept. 19, 1950            N. RANSOHOFF            2,523,058
WASHING MACHINE HAVING A ROTARY CONVEYER
AND AUTOMATIC FEED AND DISCHARGE MEANS
Filed Nov. 11, 1944            6 Sheets-Sheet 6
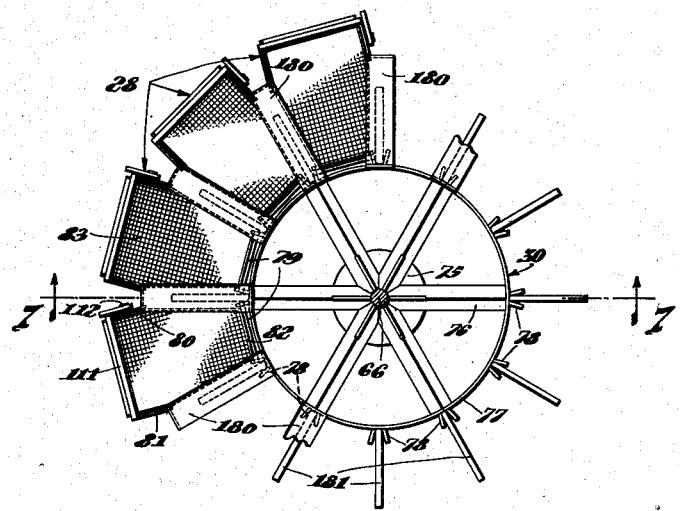
INVENTOR.
Nathan Ransohoff
BY
Wood, Arey, Herron & Evans
Attorneys.

Patented Sept. 19, 1950

2,523,058

UNITED STATES PATENT OFFICE 2,523,058

WASHING MACHINE HAVING A ROTARY CONVEYER AND AUTOMATIC FEED AND DISCHARGE MEANS

Nathan Ransohoff, Cincinnati, Ohio, assignor to N. Ransohoff, Inc., Elmwood, Ohio, a corporation of Ohio Application November 11, 1944, Serial No. 562,929

10 Claims. (Cl. 134—46)

1

This invention relates to washing machines of the type adapted for industrial usage, for instance, in washing castings or metal parts, to cleanse them of dirt, oil, grease, and chips.

More particularly the invention is directed to a washing machine embodying a stationary shell or housing which encloses a plurality of work-carrying baskets carried in a horizontal plane by a table or spider which is fixed to a drive shaft. The washing operation is conducted in one zone of the apparatus, for instance in an alkaline detergent solution, then drained, while in another zone the parts are rinsed, or sprayed with a liquid, drained, dried and finally discharged through a chute.

The principal object of the present invention has been to provide a washing machine into which castings or metal parts may be introduced continuously, the parts or pieces successively filling each basket as it advances under the feed mechanism, and then advanced toward the wash, rinse, and dry stations and finally being continuously discharged.

A further object has been to provide the feed station, wash, rinse, and dry stations, and the discharge chute successively spaced about the shell or housing to cooperate one with the other, for completion of the washing operation in an automatic manner.

A further object of the invention has been to provide means for agitating the pieces contained in the baskets as they advance through the wash, rinse, and dry stations, to insure thorough exposure of the parts or pieces in the washing and rinsing zones, and to aid in freeing the parts of surface liquid in order that they will dry quickly.

A still further object of the invention has been to provide gates or closures on the outer ends of the work-carrying baskets which are automatically unlocked and raised as the baskets approach the discharge chute to allow the work to come out of the baskets. Dips in the horizontal path through which the baskets travel cause them to be inclined whereby the work is expelled from them to the discharge chute.

A further object of the invention has been to provide a discharge lip on the automatic feed mechanism, and covers or canopies over the spaces intermediate each pair of baskets which cooperate to insure a uniform supply of work over the entire length and width of each basket and to prevent work from falling between the baskets.

A still further object of the invention has been to provide a modified form of washing machine in which the size of the various compartments may be varied to meet any requirement by providing an elongated as distinguished from a truly circular machine. In this respect the invention contemplates a structure in which two vertical, parallel drive shafts operate a pair of revolving sprockets or wheels to move the work-carrying baskets by means of a flexible belt or chain. A washing machine of any desired length or size can be obtained by this structure.

Other objects and advantages of the invention are disclosed in the following detailed description of the drawings in which a preferred embodiment is illustrated.

In the drawings:

Figure 2 is an end elevation of the machine showing the solution tanks and pump drives in addition to other details.

Figure 3 is a top plan view of the machine.

Figure 4 is a sectional plan view taken along the line 4—4 of Figure 1, showing a circular type of work conveyor.

Figure 6 is a detailed fragmentary plan view of a circular spider and its baskets.

Figure 7 is a cross sectional view of the spider and basket assembly taken along the line 7—7 of Figure 6.

Figure 9 is a fragmentary cross sectional view taken along the line 9—9 of Figure 4 showing details of construction, in elevation, at the rinsing zone.

Figure 10 is a fragmentary cross sectional view taken along the line 10—10 of Figure 4, showing the discharge of the work baskets to the outlet chute.

Figure 11 is an enlarged side elevational view of one of the work-carrying baskets.

Figure 12 is a longitudinal sectional view detailing one of the baskets and illustrating a means for vibrating the basket bottom.

Figure 13 is a bottom plan view of a basket.

Figure 14 is a cross sectional view taken along the line 14—14 of Figure 12.

Figure 19 is a diagrammatic plan view of a modified form of work conveyor.

Figure 1:
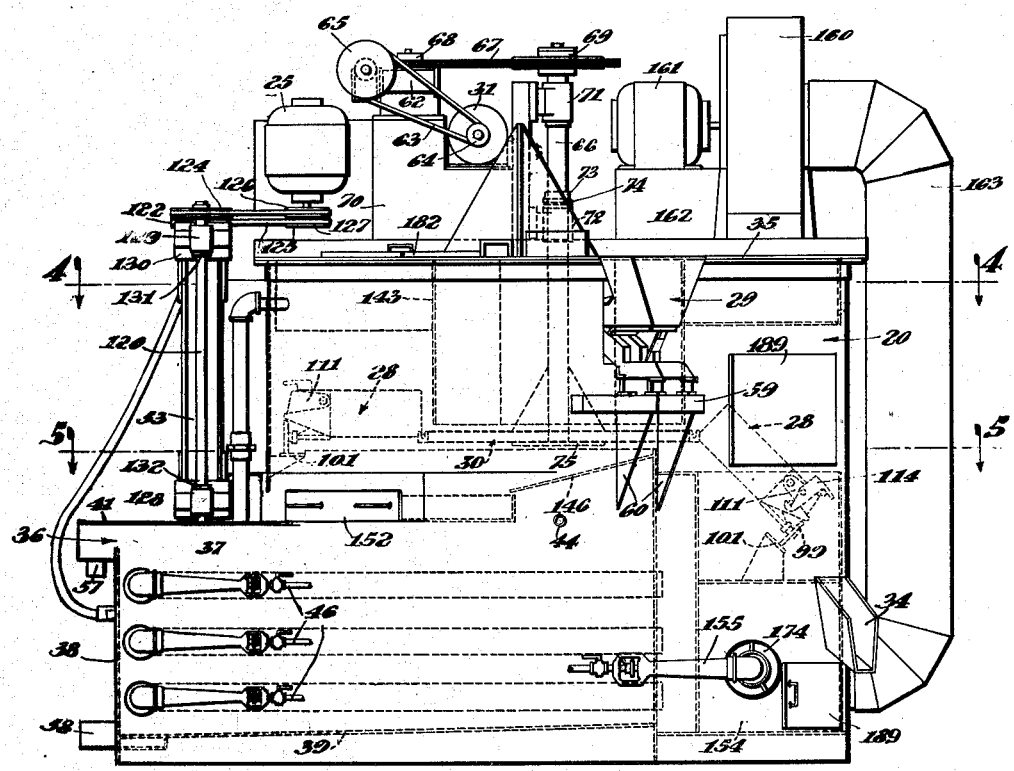
Figure 1 is a side elevation of the apparatus.

As best illustrated in Figures 1 through 5 the machines of the present invention consist essentially of a cylindrical shell, indicated generally at 20, tanks 21 and 22 for the washing solution and the rinse water, circulating pumps 23 and 24 actuated in unison by a motor 25, and spray pipes 26—26 and 27—27 positioned above the work-carrying baskets 28. A vibrating feeding mechanism, indicated generally at 29 supplies work or parts to the baskets 28 and the baskets, in turn, are carried by the driven spider table 30, motor 31 being provided to drive the table. Plenum chambers 32 and 33 above and below the baskets dry the work prior to its discharge out of a chute 34.

The cylindrical shell 20 has a top 35 and an outwardly extending tank portion 36 consisting of side walls 37—37, an end wall 38, a sloping bottom 39, and a top 40. Removable cover plates 41—41 make the tanks 21 and 22 accessible from the outside. Dividing the tank portion 36 is a vertical, longitudinal plate 42, which, with an end wall 43 located internally of the cylindrical shell, form the tanks 21 and 22 for the washing solution and rinse water solution respectively.

The shell has inlets 44 and 45 (Figure 5) for supplying water to the tanks 21 and 22. Conventional adjustable burners 46, connected to heating coils 47, heat the washing solution and rinse water to the desired degree. The tanks are equipped with thermometers 48 and 49 which are connected in the usual manner by means of pipes or tubes 50 and 51. Channel members 52 and 53, extending upwardly from the tank top 40, support the thermometers on a cross member 54. A trough 55 (Figure 5), extending across the outer, upper ends of the tanks 21 and 22, is provided with overflow outlets 56 and 57 and each tank is, in addition, provided with a drain outlet 58 suitably controlled.

The feed mechanism 29 through which parts are introduced into the apparatus is supported upon a platform 59 braced by gussets 60 and comprises a trough 61 which has its inner end cut angularly as at 62, to provide a distributing ledge from which the work may fall into the baskets. Upon vibration of the trough through a conventional vibrator which is not disclosed here in detail, parts are advanced from the hopper outwardly along the trough, those parts which are adjacent the left hand side dropping off the ledge 62 into the baskets adjacent their outer edges, while other parts are conveyed farther inwardly whereby the trough acts as a spreader distributing the work substantially uniformly over the basket area.

The basket carrying spider table 30 is driven by the motor 31 through a speed reducing unit 63 (Figure 3), a belt 64 operably connects the motor with the speed reducer by means of sheaves 65—65, and the speed reducer is, in turn, connected to a central vertical shaft 66, of the spider table, by a chain 67 and sprockets 68 and 69. The motor and speed reducer are mounted at the top of shell 20 on a platform 70.

The upper end of the vertical shaft 66 is journalled in blocks 71 and 72 while the shaft 66 extends downwardly through the shell roof 35 to carry the spider table 30 at its lower extremity. Adjacent the journal block 72 shaft 66 carries a collar 73, fixed thereto, which supports the table and shaft upon a thrust bearing 74 with the lower race of the bearing 74 engaging the upper face of the block 72 and the upper race being engaged by collar 73.

The spider comprises a disc 75, fixed to the lower end of the shaft 66, which carries a plurality of inverted angle irons 76 extending radially, outwardly to carry a ring 77 at their outer extremities. Gusset plates join the angle irons 76 to the shaft 66 to rigidify this structure. Radially spaced about the outer circumferential face of the ring 77 are a plurality of pairs of journals 78, each pair rotatably journalling a basket 28 so that it may move pivotally upwardly and downwardly.

Each basket 28 has a cross shaft 79, adjacent the lower extremity of its inner end, which is journalled in the pillow blocks 78. The frame of each basket consists of two side walls 80 and 81 with the frontwise portions thereof being substantially parallel (Figure 13) and the back portions converging toward the central drive shaft; this gives each basket greatest area commensurate with their radial spacing and pivotal movement. Joining the inner ends of the side walls is a rear wall 82 which carries the cross shaft 79. A perforated or screen bottom 83, supported at its outer and inner ends by cross supports 84 which are a substantial distance up from the bottom edges of the walls, slopes toward the inner end of the basket.

The screens forming the bottoms of the baskets are vibratable in order that the work disposed thereon may be jogged to shift its position whereby the surfaces of the parts are exposed thoroughly to treatment and also whereby surface water or solution carried on the surfaces may be shaken away. For this purpose each screen has a longitudinal rod 85 lying along its underside; this rod is bent downwardly and forwardly as at 86 where it joins with a cross rod 87. Lateral rods 88 joining the cross rod 87 and the longitudinal rod 85 provide additional support and at the juncture there is a vertical rod 89 which further stiffens this network. Cross rod 87 lies in a plane below the basket walls and has its ends turned upwardly to pass through elongated vertical slots 90 adjacent the lower edges of the basket side walls 80 and 81. The ends of the rods are flattened as at 91 whereby they are retained in place. This rod network is free to move in an up and down direction and upon doing so imparts its movement to the screen.

A pair of discs 92—92, fixed to the outer end of a shaft 93 which is driven by a motor 94 (Figure 5), carry a plurality of rings 95 loosely journalled on pins 96 passing through and between the discs 92 adjacent their outer peripheral edges. This assembly is positioned in one of the drain pans (as described at a later point in the specification) and is adapted to engage the cross rods 87, of the baskets, between the discs 92—92, to shake the basket bottoms as they traverse the drying portion of he machine. As the discs turn the rings successively engage the cross rod 87 whereby the desired shaking action is produced.

Toward the front of each basket, the side walls rigidly are joined beneath the screen bottom by means of a cross member 97. Extending forwardly from and at right angles to the cross member 97 is a shaft 98 which carries a wheel or roller 99 journalled on its forward end. A gusset plate 100 rigidly joins the member 97 to the shaft 98 midway of the cross member. This structure furnishes guide roller support for the baskets at their outer ends.

A circular track 101 is provided on the interior of the shell and is adapted to support the front ends of the baskets by engaging the rollers 99. Brackets 102 are utilized to mount the track to the shell or casing 20. Cut-out portions 103, 104 and 105, provided in the tracks beneath the wash spray pipes 26—26, the rinse spray pipes 27—27 and the plenum chamber 32, respectively, allow the basket wheels to drop from the track in these sections to bring a collar 106, behind the basket wheel, into engagement with racks 107, 108, and 109 to jog the work in the baskets as they pass through these sections. This shaking mechanism is employed in addition to the screen-vibrating mechanism previously described and it will be readily apparent that either or both may be employed at any station. It has been found that the jogging of the work during washing and rinsing insures a uniform cleansing and drying of all the work.

Adjacent the discharge chute 34 the track 101 dips sharply, downwardly as at 101a and cooperates with a cam rail 110 (Figure 4), which spans the dip in 101a in the track, to open a gate 111, on the front of each basket, to discharge the work onto the chute 34 and, thence, to any convenient receptacle (not shown).

Figures 8, 20:
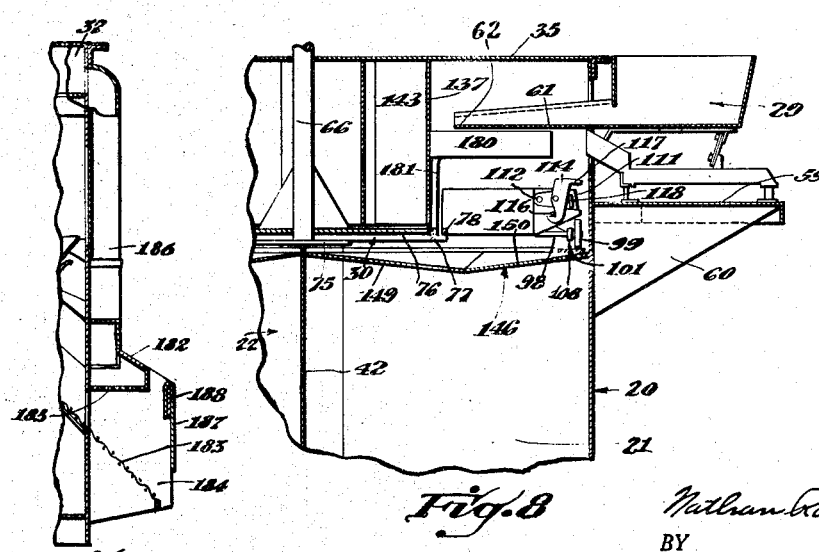
Figure 8 is a fragmentary cross sectional view taken along the line 8—8 of Figure 4 illustrating the loading hopper.
Figure 20 is a sectional elevation through the discharge chute showing a modified structure for blowing the parts with air as they are discharged to remove from them the last traces of water.
Figure 5:
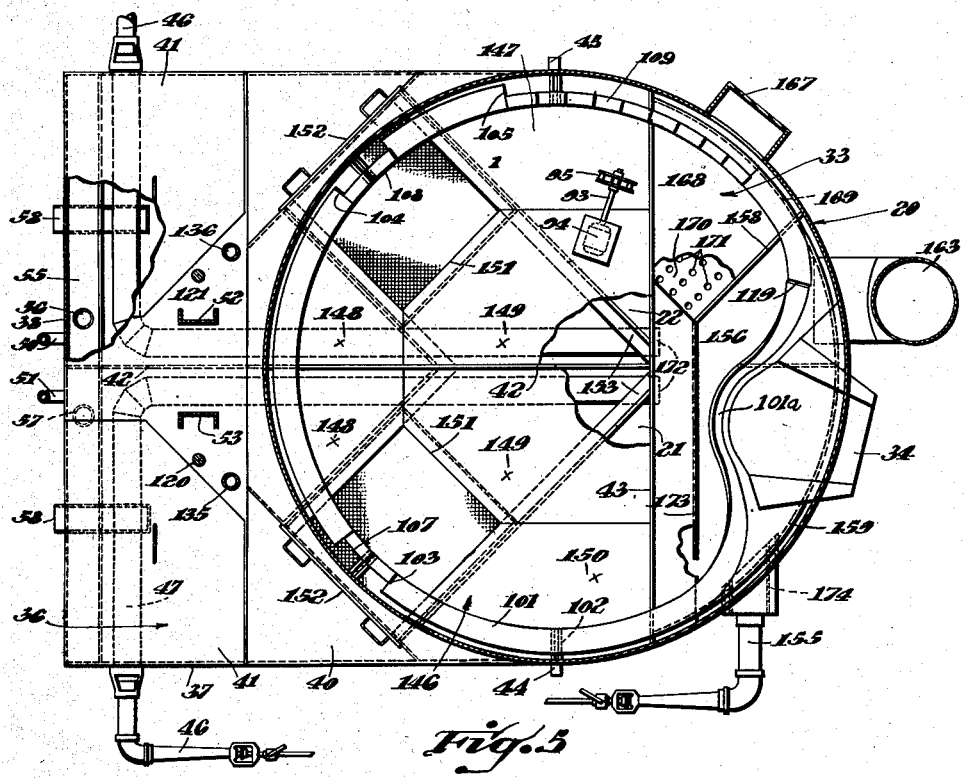
Figure 5 is a sectional plan view taken along the line 5—5 of Figure 1 to illustrate the washing and rinsing drains and discharge chute.
Figure 15:
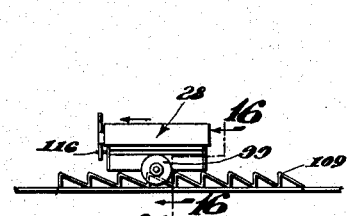
Figure 15 is a detailed end elevation of a basket and jogging means.

Gates 111 of the baskets consist of U-shaped members with the sides of the U being pivotally connected to the side walls of the basket as at 112 and 113. A latch 114 is pivotally connected to one side of each U-shaped gate as best illustrated in Figures 8, 10 and 11, the latch being disposed off center and provided with a jaw portion 115 on its lower, inner side to engage a pin 116 fixed in the side 79 of the basket. Through the off center arrangement the latch will normally be held in latched position under its own weight and will positively retain the gate in closed position. However, as each basket approaches the discharge chute, a forwardly projecting arm 117, at the top of the latch 114, engages the cam rail 110. Upon downward movement of the forward end of the basket as provided by the track dip 101a, the cam rail acts to unlock the latch and to pivot it counterclockwise until the front edge of its lower portion engages a block 118, fixed to the gate, to arrest further pivotal movement. As the basket continues to pivot downwardly, the latch cooperates with the block 118 and the cam rail 110 raises the gate to allow the work to be discharged from the basket.

Just prior to the discharge operation the basket receives a jolt, by means of a step or offset 119 in the track, to loosen any work that may have "frozen" in the basket. After completing the discharge of its contents, the basket follows the track upwardly to a horizontal plane and, at the same time as the basket is raised, the cam rail allows the gate 111 to close. At this point the arm 117 of the latch disengages the rail and allows the latch to pivot to a locked position. The cam rail preferably is spaced somewhat above the track so that the gate falls shut upon leaving the rail.

As previously described pumps 23 and 24 which, for instance, may be of the centrifugal type, are employed to force the washing solution and the rinse water through the spray pipes 26—26 and 27—27. Extending into the supply tanks 21 and 22 respectively, the pumps 23 and 24 are provided with vertical drive shafts 120 and 121 which extend upwardly through the tank top 40 and carry sheaves 122 and 123 fixed to their upper extremities. Belts 124 and 125 operably connect sheaves 122 and 123 to sheaves 126 and 127 fixed to the drive shaft of the motor 25. The vertical drive shafts 120 and 121 are rotatably journalled in blocks 128 and 129 fixed to the upwardly extending channel irons 52 and 53, respectively, by brackets 130 and collars 131 and 132, fixed to the drive shafts below the upper bearing block 129 and above the lower block 128, operably supporting the pumps and drive shafts. Plates 133 and 134 rigidly join the channel irons 52 and 53 to the casing 20.

Figure 17:
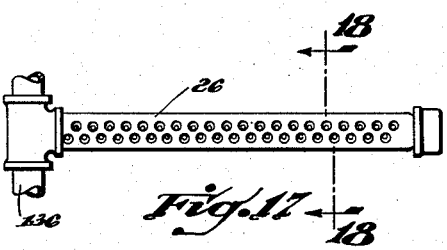
Figure 17 is an enlarged bottom plan view of a typical spray pipe for washing and rinsing.
Figure 16:
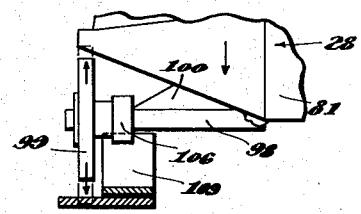
Figure 16 is a fragmentary sectional view of the shaker apparatus taken along the line 16—16 of Figure 15.
Figure 18:
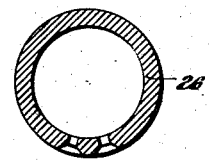
Figure 18 is an enlarged cross sectional view taken along the line 18—18 of Figure 17.

The pumps 23 and 24 discharge into pipes 135 and 136 which extend upwardly through the tank top 41 and horizontally through the casing 20 to the pairs of spray pipes 26—26 and 27—27 respectively. As best illustrated in Figure 17, each spray pipe is provided with a plurality of apertures in its underside and a cap on its inner end.

A cylindrical, vertical wall 137 depending from the cover plate 35 and terminating adjacent the upper side of the spider 30 has cut-out portions 138 and 139 adjacent the inner ends of the spray pipes. Radially extending walls 140, 141 and 142 define the wash and rinse compartments and are fixed, as by welding, to the top 35 and to the corners of an inner housing, formed of mating pairs of parallel, vertical walls 143 which form a closure for the drive shaft 66. Supplemental pairs of parallel splash plates 144 may also be provided for the wash and rinse spray pipes; these are fixed to the top 35 and to the edges of the cut-out portions 138 and 139 of the cylindrical wall 137. Drain plates 145, sloping outwardly below the inner ends of the wash and rinse spray pipes, are fixed to the cylindrical wall, the radial walls and the walls 143 as shown in Figures 4 and 9.

The wash and rinse compartments have drain pans 146 and 147. Each pan is composed of three sections 148, 149 and 150 which are connected to the end wall 43, the tank dividing wall 42 and the shell 20. The pan sections slope toward a cut-out portion 151 above a sliding drawer 152 which is provided with a screen bottom to catch any chips or particles of dirt or the like which may be washed or rinsed from the work. As the drawers are positioned immediately above the tanks, all of the wash solution and rinse water will be returned to the tanks through the drawers. The drawers 152, which ride on angle iron rails 153 fixed to the tank walls, may be withdrawn and cleaned when and as necessary.

A hot air chamber 154, provided with a conventional adjustable heater 155, similar to the heaters 46, is positioned in the base of the shell 20 adjacent the tank section and is delineated by the tank wall 43, a top 156, a bottom 157, an end wall 158 and the shell 20, with a double wall, as indicated at 159, being provided adjacent the shell. Air is conducted from the chamber 154 to a blower 160, located at the top 35 and driven by a motor 161 supported on a platform 162, through a conduit 163. The blower 160 supplies hot air under pressure from the chamber 154 to the plenum chamber 32, above the baskets 28, and apertures 164 in the bottom 165 of the chamber 32 provide streams of hot air to the work in the baskets. The chamber 32 is also provided with a double outer wall as indicated at 166, for insulation purposes.

Hot air under pressure is supplied to the lower plenum chamber 33 through a conduit 167 connecting the upper chamber 32 to the lower chamber 33. This lower chamber is delineated by the tank wall 43, a bottom 168, the end wall 158, a double outer wall 169, and a top plate 170, which may also be provided with apertures 171 to provide streams of hot air to the work in the baskets from the underside. The ends 172 of the heating coils 47 may extend through the wall 43 to provide additional hot air to the chamber 154 with a baffle plate 173 breaking the flow of air. Cold air is drawn into the chamber 154 through the opening 174 provided by the open ends of the double sleeve connecting the heater 155 to the shell. Vent pipes 175 and 176, extending upwardly from the inside of the shell 20 and passing through the roof 35 are positioned at opposite sides of the shell.

In the modified form of wash, rinse and dry machine illustrated diagrammatically in Figure 19, a pair of vertical drive shafts 177 and 178 are utilized to drive a continuous flexible belt on chain 179 which carries the baskets 28. By this structure an elongated machine may be provided of any desired length and, consequently, the various stations or compartments may be made to any desired size. It may be seen that the mechanism and other instrumentalities utilized in the circular machine, just described, are readily applicable to this type of machine and therefore it is not illustrated or described in further detail.

A modified form of discharge chute is shown in Figure 20 according to which a canopy 182 is placed over the discharge opening of the apparatus through which the parts emerge. The floor of the chute is constituted by a screen 183 which is supported between the side walls of a box 184 extending around the discharge opening. The canopy 182 has a lower wall or grating 185 arranged just above the outlet opening and this lower wall forms the terminal of a duct 186 extending upwardly along the machine into communication with the upper chamber 32. At the front end of the box a gate 187 hangs from a cross strap 188 which spans the side walls of the box 184. As parts come out of the machine they are exposed to a blast of air emerging from the openings in the grating 185. This air blast blows the last remaining traces of water from the parts and by virtue of the heated condition of the air, surface moisture is evaporated from the parts. It is the purpose of the screen 183 to allow any drops of water blown from the parts to pass through the screen out of the chute so that the surface over which the parts pass remains dry. An opening may be cut into the wall of the machine below the chute so that air passes from the lower chamber through the screen 183.

In operation, the work to be washed, rinsed and dried, is first dumped into the vibrating feeder 29 from which it is evenly distributed to the baskets 28 by means of the angularly cut lip 62. The work is prevented from falling between the baskets by canopies or deflectors 180 positioned over the space between each pair of baskets. These canopies are carried by hangers 181 having portions extending upwardly and outwardly from the basket carrying ring 77; these canopies serve to direct the work to either one or the other of the pairs of baskets that they are positioned between.

The baskets are driven by the motor driven shaft 66 and the spider table 30 at a rate of speed just sufficient to allow the proper amount of work to be deposited in each basket before it passes beyond the feeder. At this point the basket, now loaded, enters the wash chamber and the next succeeding basket is being filled. The filled baskets travel through the wash chamber for a period of time sufficient for the work to be thoroughly cleansed before passing on to the rinse chamber where, likewise, they remain a sufficient period of time to be thoroughly rinsed of all of the washing solution. From the rinse chamber, the baskets successively pass into the drying chamber where the upper and lower plenum chambers 32 and 33 play streams of hot air onto the work to dry it thoroughly. The shakers 107, 108 and 109 located adjacent the wash, rinse and dry stations, as well as the screen vibrating means 95 adjacent the dry station, facilitate the operations to which the work is being subjected.

As the baskets leave the dry stations their front ends dip downwardly, as governed by the dip in the track 101; meanwhile the basket gates 111 are raised by the latches 114 and the cam rail 110, to discharge the work onto the chute 34. The offset or step 119 at the start of the dip imparts a shock or jar to the work in the baskets to loosen any work that may have "frozen" therein.

After having discharged their work, the front ends of the baskets rise and the gates are closed and latched before proceeding to the feed station to receive another supply of work. The operations are, therefore, continuous and need not be interrupted as long as a supply of work is maintained in the feeder.

Removable cover plates 189 are provided for the various chambers and compartments to facilitate servicing as well as the other means, previously described, for servicing, filling and draining the tanks and removing chips and dirt washed from the work.

Having described my invention, I claim:

1. An industrial cleaning machine, comprising a casing having a track therein, a conveyor disposed within the track and having a plurality of work holding baskets extending outwardly therefrom, the said baskets having wheels riding on the track and the endwise portions of said baskets having liftable gates forming closures therefor, a latch for locking said gates in closed position an outlet located below said conveyor, said track having a dip portion adjacent said outlet whereby the gated ends of the baskets are lowered to dispose the baskets on an incline as they successively pass said dip portion, means above said dip portion of the track adapted to engage said latches to unlock said gates and arranged to lift the basket gates as the baskets are inclined, and means for moving said conveyor.

2. In an industrial cleaning machine having a casing, a rail having a major portion thereof extending in a substantially horizontal plane at the inside of said casing and having a minor portion thereof in the form of a dip, a conveyor within said rail and comprising a plurality of baskets mounted for pivotal movement at a point inwardly of said rail and having their outer endwise portions in supported engagement with said rail, whereby portions of the baskets successively engaging the dip portion of the rail are lowered to dispose the baskets in an inclined position for ejection of parts therefrom, and the rail having one section in a plane above the other connected by a substantially vertical step-off section at the beginning of said dip portion of the rail constructed and arranged to cause the outer portions of the baskets to drop by gravity down the step-off section to subject the baskets to a jolt for shaking loose parts within the baskets which otherwise might be lodged against gravity discharge therefrom.

3. In an industrial cleaning machine, comprising a casing having a track at its interior, a conveyor having a plurality of baskets pivotally mounted on said conveyor and extending outwardly therefrom, wheels rotatably carried by said baskets for riding upon said track, and means for jogging said baskets as they move through a predetermined zone, comprising a plurality of teeth for supporting engagement with the outer endwise portions of said baskets independently of said track, said track being interrupted at said teeth, the baskets having rollers substantially smaller in diameter than said wheels pivotally mounted on the axis of said wheels and arranged to ride over said teeth to jog the baskets during passage thereover.

4. In an industrial cleaning machine, a conveyor having a plurality of work supporting baskets extending outwardly therefrom, said baskets having foraminous vibratable bottoms, a vibrator constructed and arranged to shake the bottoms of said baskets as they move through a predetermined zone, comprising a rotatable member having a plurality of abutments spaced apart from one another about the periphery thereof, and positioned to vibrate the bottoms of said baskets successively as the baskets are moved by said conveyor, said bottoms each including an elongated bar engageable by the abutments to produce a series of vibrations as the baskets advance over the rotatable member.

5. An industrial cleaning machine, comprising a casing having walls delineating a wash section, a rinse section and a drying section, a track arranged within said wash, rinse and drying sections and extending about the interior of said casing, a conveyor disposed within said track and having a plurality of baskets pivotally mounted thereon and extending therefrom outwardly into supported engagement with said track, said track in said drying section having a dip therein, and a chute arranged adjacent said dip, the outer ends of the baskets being lowered as they traverse said dip portion to successively incline the bottoms of said baskets for gravity ejection of parts therefrom into said chute.

6. An industrial washer, comprising a conveyor having a plurality of baskets pivotally mounted thereon and extending outwardly therefrom, a track for supporting the outer endwise portions of said baskets, a vibrating feeder having a ledge portion overlying said baskets, the said ledge portion being cut on an angle with respect to the path of travel of the baskets therebeneath, whereby parts are dropped from said ledge substantially uniformly longitudinally of the bottoms of said baskets, and canopies supported by said conveyor and respectively disposed beneath said ledge sufficiently above the spaces between the baskets to spread the parts laterally of the bottoms of the baskets.

7. An industrial washing machine comprising a rotatable support, a plurality of work supporting baskets extending radially outwardly from said work support and being in pivotal connection therewith, a track supporting the outer portions of said baskets, a casing surrounding said baskets, means for applying washing and rinsing fluids respectively to work contained in said baskets, said baskets having vibratable bottoms, and vibrator means beyond said rinsing station positioned to engage and shake the bottoms of said baskets successively and thereby shake rinsing fluid from the surfaces of the parts contained therein, said means constituting a rotary member having a series of abutments and said vibratable bottoms each having an elongated bar engageable by the abutments to produce a series of vibrations as the basket advances over the rotary member.

8. An industrial washer comprising a circular casing having a pair of tanks arranged in side by side relationship to one another extending outwardly therefrom for holding washing fluid and rinsing fluid, a rotatable support within said casing, a plurality of work supporting baskets extending outwardly in radial directions from said support, impeller pumps having the shafts thereof extending along said casing, the said impellers of said pumps being disposed within said outwardly extending portions of said tanks, means constructed and arranged to direct the fluid discharge from said pumps upon the work supported in said baskets, and pump drive means superimposed above said casing including vertical drive shafts extending downwardly along said casing in direct connection with the pump impellers.

9. An industrial washing machine comprising a casing having an endless track at the interior thereof, a plurality of baskets having endwise portions thereof supported upon said track, a movable carrier pivotally supporting the opposite endwise portions of said baskets, said baskets having pivotally mounted gates at the outer endwise portions thereof adjacent said track, said track having a dip therein at one portion thereof whereby said baskets are inclined for discharge of the contents thereof in passing said dip, a second track spanning said dip, a latch mounted on the free end of said gates, said latch including an arm engageable with said second track to elevate each gate as the basket is inclined.

10. In an industrial cleaning machine, a rotary conveyor having a plurality of work supporting baskets extending outwardly therefrom, said baskets having perforated vibratable bottoms, wheels pivotally mounted on the outer ends of said baskets, a track for supporting said wheels, a serrated track section for jogging the baskets as they move through a jogging zone, the conveyor track being interrupted at the serrated zone, the baskets having rollers substantially smaller in diameter than said wheels mounted on the axis of the wheels and arranged to support the baskets upon said serrated sections to jog the basket during passage thereover, a rotatable vibrator having a plurality of abutments engageable with said bottoms during passage of the baskets over the serrated section to vibrate the bottom of the basket while the basket proper is jogged.

NATHAN RANSOHOFF.

REFERENCES CITED

The following references are of record in the file of this patent:

UNITED STATES PATENTS

| Number | Name | Date |
|---|---|---|
| 27,439 | Frazee | Mar. 13, 1860 |
| 57,529 | Maine | Aug. 28, 1866 |
| 837,559 | Graham | Dec. 4, 1906 |
| 873,748 | Henson | Dec. 17, 1907 |
| 1,463,964 | Miller | Aug. 7, 1923 |
| 1,533,150 | Ulrich et al. | Apr. 14, 1925 |
| 1,553,428 | Benn | Sept. 15, 1925 |
| 1,626,707 | Soubier | May 3, 1927 |
| 1,776,568 | O'Neale | Sept. 28, 1930 |
| 1,840,294 | Richards | Jan. 5, 1932 |
| 2,115,202 | Kimball | Apr. 26, 1938 |
| 2,219,954 | Geiger | Oct. 29, 1940 |